United States Patent
Cole

[11] 3,864,017
[45] Feb. 4, 1975

[54] OPTICAL FIBER ARC-TO-LINE CONVERTER

[75] Inventor: Henry B. Cole, East Woodstock, Conn.

[73] Assignee: American Optical Corporation, Southridge, Mass.

[22] Filed: May 31, 1973

[21] Appl. No.: 365,774

[52] U.S. Cl. .................................... 350/96 B
[51] Int. Cl. ................................... G02b 5/16
[58] Field of Search ........................ 350/96 B

[56] References Cited
UNITED STATES PATENTS
3,210,462  10/1965  Trott ........................... 350/96 B X

*Primary Examiner*—David H. Rubin
*Attorney, Agent, or Firm*—H. R. Berkenstock, Jr.; William C. Nealon

[57] ABSTRACT

An optical fiber array, which converts an arcuate image to a plane image with minimum of distortion, is provided by forming multifilament fibers into multiple fiber units which are bent, nested together and then trimmed to form an arcuate image plane on one side subtending the desired input arc and forming a flat, planar image plane on the other side of the array.

11 Claims, 10 Drawing Figures

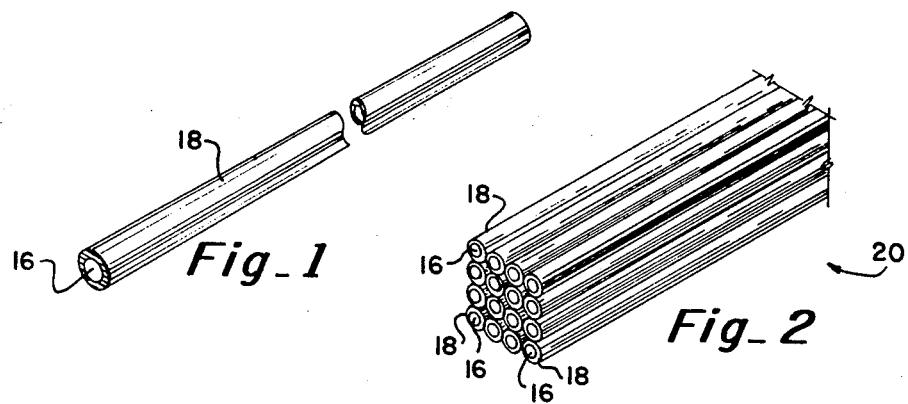
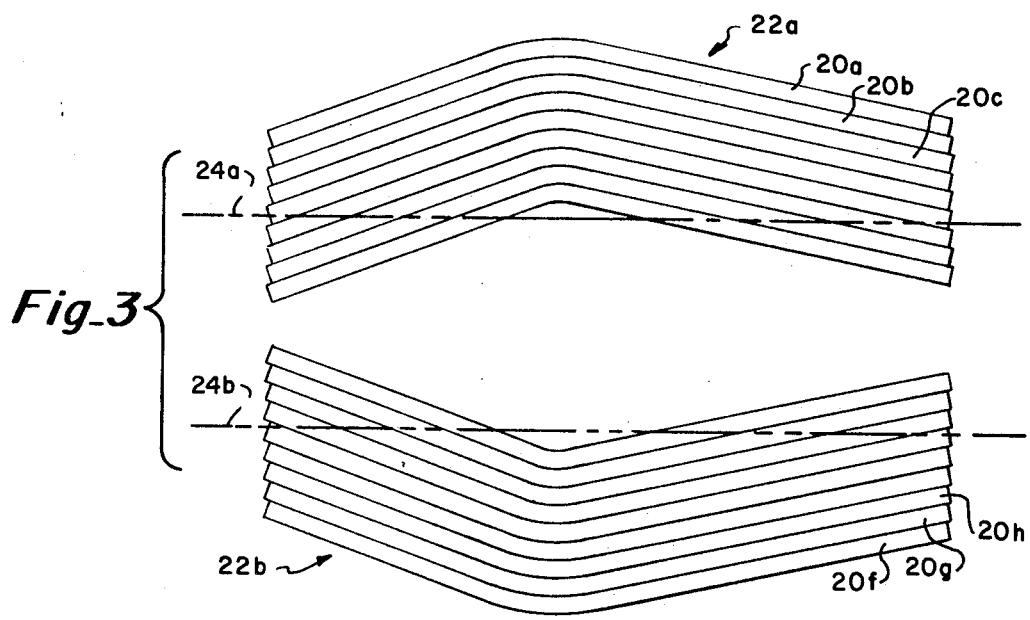
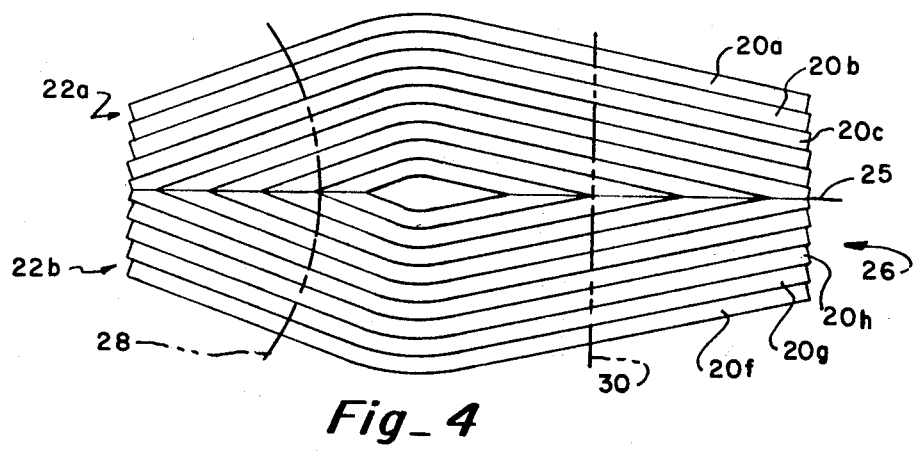

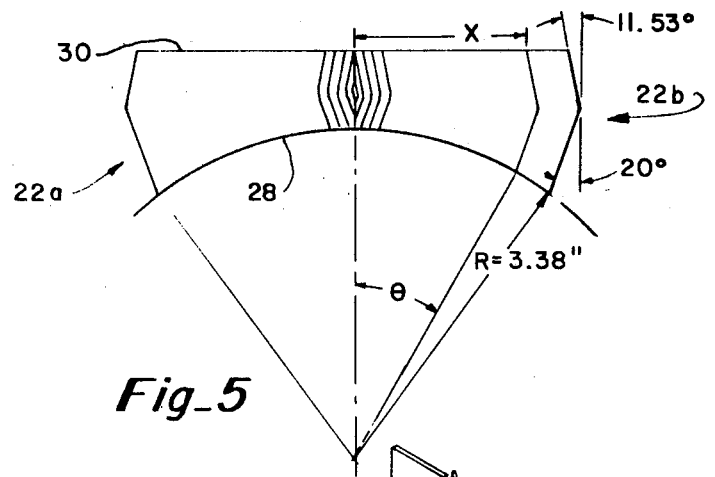
Fig_5
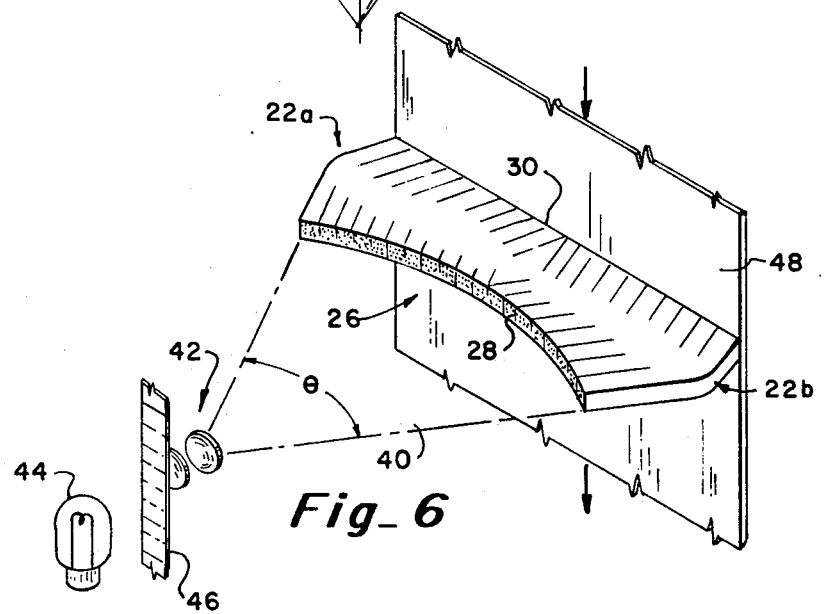
Fig_6
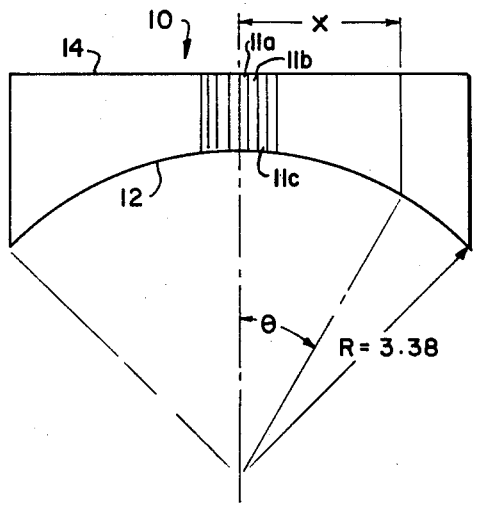
Fig_7

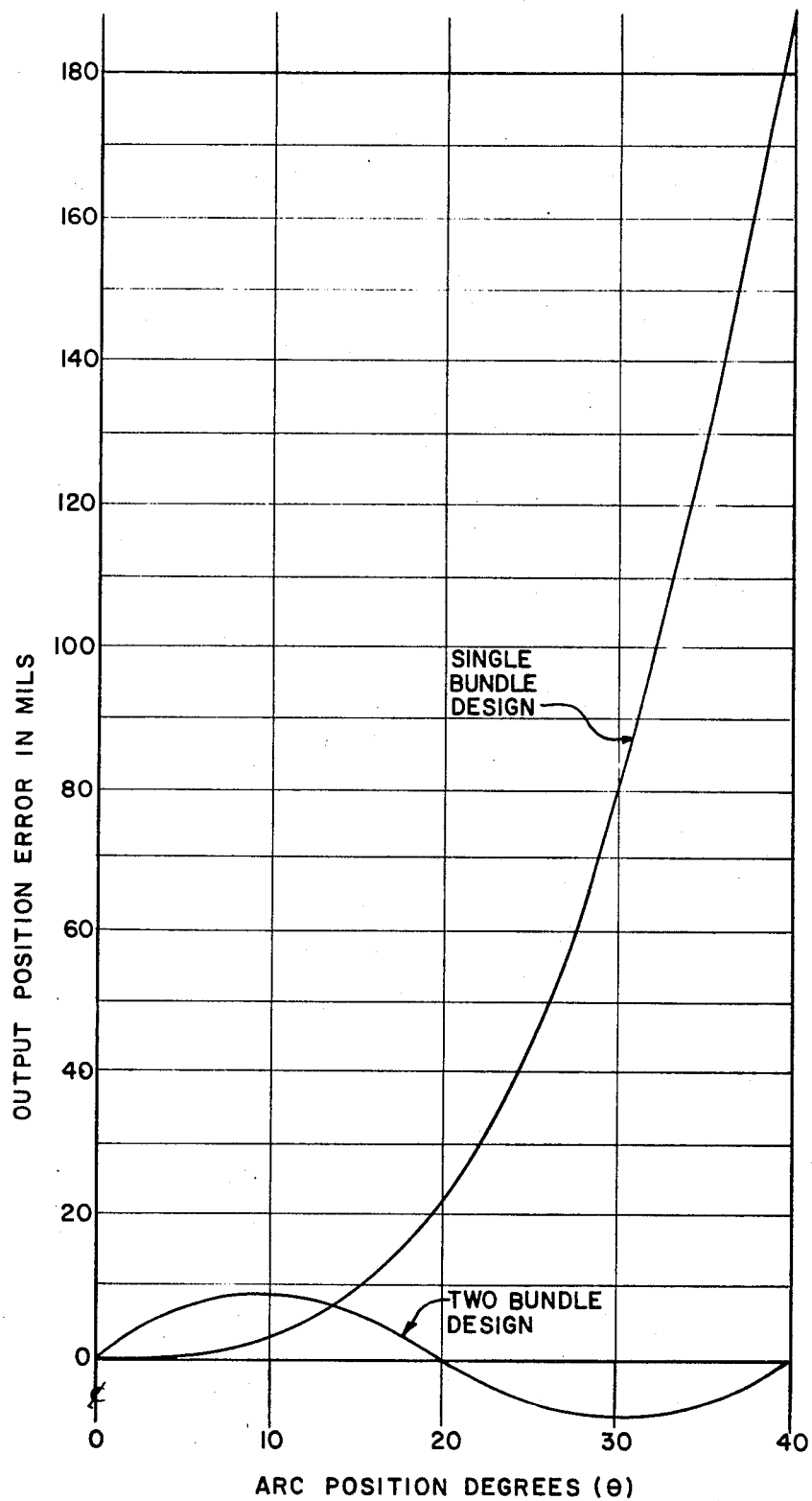
Fig_8

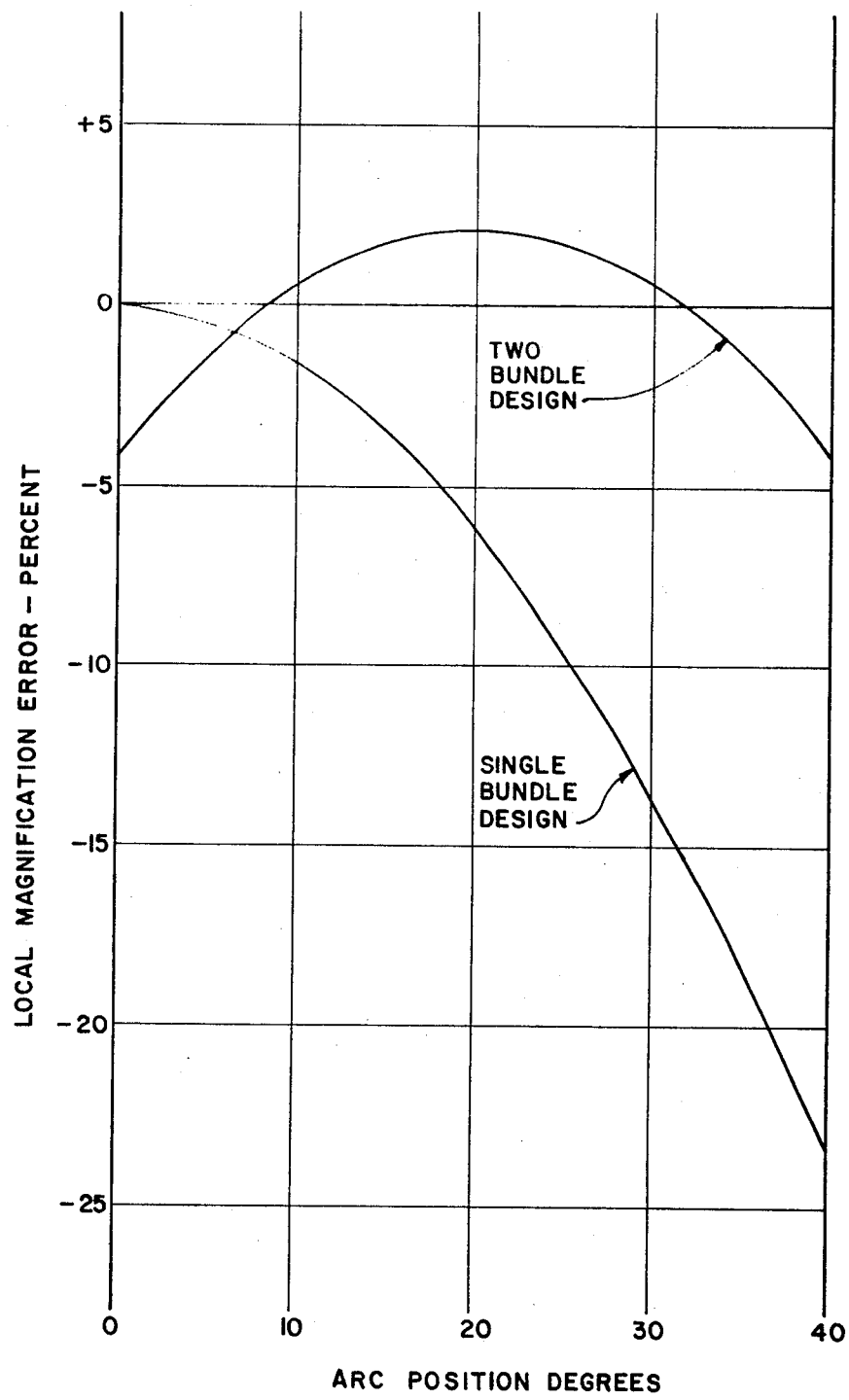
Fig_10

OPTICAL FIBER ARC-TO-LINE CONVERTER

FIELD OF THE INVENTION

This invention relates to fiber optic field flatteners or arc-to-line converters, forming a flat image from an arcuate plane image.

BACKGROUND OF THE INVENTION

In producing flat images, and particularly enlarged photographs from film projections, using a projector having a curved field lens, substantial distortion or magnification occurs especially at the lateral edges of the subsequent image. One attempt to produce such a flat enlargement utilizes an assembly of parallel fibers having an arcuate plane input matching the arcuate image plane from the projector, and a flat image plane on the output side of the fiber optic. The theoretical errors increase very rapidly with increasing angular subtend of the arc, and light rays entering the input edge of the fibers approaches or surpasses the acceptance range for normal high NA (numerical aperture) fibers.

Other designs form and position individual fibers to give rays that are essentially free from theoretical errors, but such units are extremely difficult and very expensive to produce. These older designs tend to be limited to arcs of small angular subtend, or are excessively costly.

ADVANTAGES OF THE PRESENT INVENTION

The present invention provides a means to utilize a small number of subassemblies each incorporating acceptable theoretical errors but simple enough to manufacture inexpensively, providing a fiber optic arc-to-line converter. The invention provides a workable arc-to-line converter made up of components which are simple and inexpensively manufactured, and which offer a good compromise of theoretical performance and manufacturability. The number of subassemblies may be chosen to provide for either improved accuracy or greater angle of subtend, in some cases at the expense of some difficulty of manufacture. The arc-to-line converter of the invention provides the conversion of an arcuate image to a planar image with minimum of distortion and minimum variation of local magnification. The converter of the invention may be used to receive light from a projector which produces an arcuate image plane matching the curvature of the image input of the converter, and the fiber optic converter transmits the image to a flat image plane. From a flat image plane the image may be transmitted to a photosensitive copy material. Thus, an image on a film in the projector may be enlarged and reproduced on a flat sheet with acceptable distortion across its extent.

GENERAL DESCRIPTION OF THE DRAWINGS

The fiber optic arc-to-line converter includes an assembly of a plurality of generally clad, monofilament fibers formed into multiple fiber units of a cross-sectional dimension corresponding to the thickness of the desired arc-to-line converter. These subassemblies are then heated, bent to a desired angle, and then nested together in side-by-side relation. Two groups of such subassemblies are arranged in mirror image relation, and after trimming the two are then secured together to form the base unit of the fiber optic. The connected subassemblies are then formed into the finished product having an arcuate image plane and a flat output image plane.

The specific features and advantages of the invention will appear in the following description and appended claims, reference being made to the accompanying drawings forming a part of the specification.

FIG. 1 is a perspective view of a clad monofilament optical fiber useful for forming the device of the invention;

FIG. 2 is a subassembly of a plurality of clad monofilament fibers arranged in a thickness of the desired arc-to-line converter;

FIG. 3 is a generally schematic view of a pair of groups of subassemblies which has been bent to a desired angle, secured together, and showing trim lines preparatory to joining the two groups into a converter assembly;

FIG. 4 is a generally schematic view of a joined pair of subassemblies with trim lines indicated to produce an arcuate input image plane and a flat output image plane for the arc-to-line converter of the invention;

FIG. 5 is a plan view, somewhat distorted for clarity, of one form of an arc-to-line converter according to the invention;

FIG. 6 is a perspective view, generally schematic, of an assembly of the necessary mechanisms for using the arc-to-line converter in projecting an image from film onto planar photosensitive copying material;

FIG. 7 is a plan view of a parallel fiber arc-to-line converter illustrating dimensions necessary for using a converter, and, also, illustrating in conjunction with mathematics, the distortion errors inherently found in such a structure;

FIG. 8 is a graph of comparisons of position errors in a single bundle arc-to-line converter and a two-bundle arc-to-line converter, plotting output position error against arc position;

FIG. 10 is a graph of the magnification error of single and double bundle arc-to-line converters plotting local magnification error in percent against arc position.

SPECIFIC DESCRIPTION OF THE DRAWINGS

Figure 9:
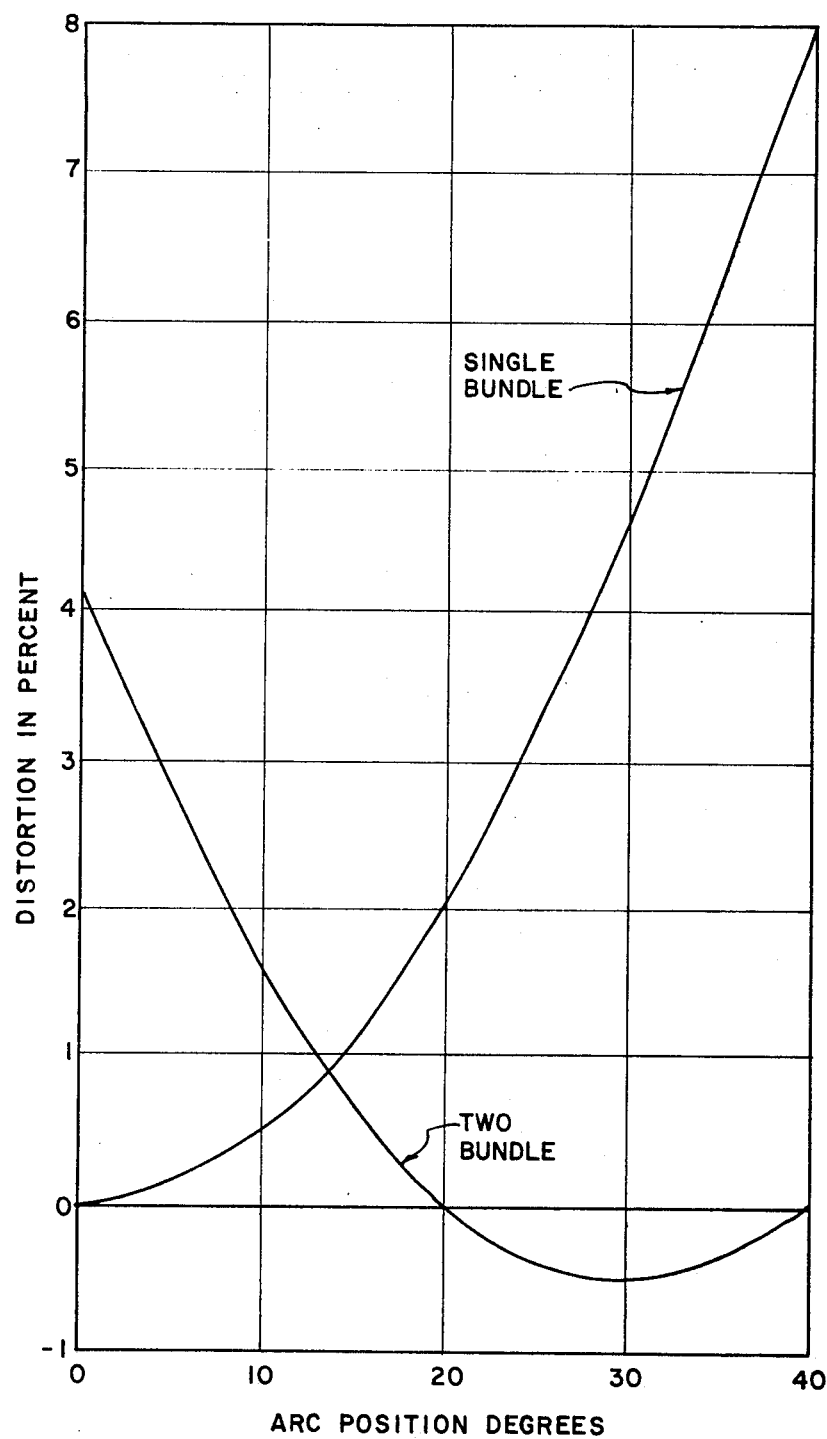
FIG. 9 is a graph of the percentage distortion plotted against arc position of both single and double bundle arc-to-line converters.

In designing an arc-to-line converter, it must first be decided what arc is to be subtended and the distance from the input image plane of the arc-to-line converter to the lens of the projector. The curvature of the input plane must match the curvature of the lens of the projector to provide uniform straight line radials from the lens to the input plane of the arc-to-line converter. Desirably, there should be a lineal relation between the input angle and the output position, represented by the formula (1)  $X = K O$ where $K$ = inches (distance from the lens to the input plane) over angles subtended or $$K = X \text{ inches } \frac{\text{(distance from lens to input plane)}}{\text{angle subtended } (\theta)}$$

With no magnification or distortion the arc radius is (2)  $R = K (180/\pi)$

The simplest fiber optic converter, shown generally in FIG. 7 by the numeral 10, is a simple ribbon of parallel optical fibers, with the fibers running parallel to the central fiber of the converter. The converter 10 has an arcuate input plane 12 and a straight or planar output 14. The actual output position is given by:

(3) $X = R \sin \theta$ where $R$ is the radius.

Thus, compared with the desired radius position at 40° (for example), the half-line of $X$ will be shortened by the sin of angle $\theta$ (40° in this case) or some 7.9 percent. Local magnification will vary downwardly from unity at the center of the converter to $\cos \theta$ at the edge. For a 40° subtended angle, this is 0.766.

In addition to the severe distortion, such a simple construction as FIG. 7 would have numerical aperture (NA) problems due to the high angular input into the input edge of the fibers. Light rays from the lens would be entering the edge fibers at up to about half of the subtended angle from the fiber axes. This would also be the internal angle of the rays because of the nearly normal incidence. It corresponds to a very high NA value which is beyond the acceptance range for optical fibers. (For example, in 1.04 NA fibers having a 1.81 index of refraction core and a 1.48 index of refraction cladding, the limiting internal angle is 35°.

According to the present invention, the range of angles at which the fibers meet the input surface can be reduced by dividing the fibers into groups, each group meeting the input arc at a different angle. Bending of the fibers is required in order to provide contiguous outputs. Various designs can be considered differing in the size of the fiber groups and the range of angles at which the fibers meet the input arc.

In FIG. 1 optical fiber 16 is clad with cladding 18, such optical fiber with cladding is known in the art and detailed description is believed unnecessary. A series of the optical fibers may be formed into a bundle, FIG. 2, wherein a bundle of the optical fibers 16, is made four high and four wide forming a bundle 20. It is readily ascertained that the range of angles at which fibers meet the input surface of an arc-to-line converter can be reduced by dividing the fibers into groups, each group bent in order to provide contiguous outputs. Various designs may be considered differing in the size of the fiber groups and the range of angles at which the fibers meet the input arc. The larger the number of fiber groups, the smaller the range of angles can be. As the range in angles is reduced, the theoretical errors will also be reduced. But the greatest gains will result from the initial steps, with decreasing improvement as the number of groups approaches the number of fibers. Further, the difficulty of fabrication will continue to rise rapidly as the number and variety of groups is increased. In considering the balance between the theoretical errors and the practical fabrication errors, a good compromise may consist of only two groups of bundles of fibers. In the bundle of FIG. 2, the four wide and four high fibers provide the thickness of the desired thickness of the converter. Once a plurality of subassemblies 20 has been manufactured they may then be bent and placed together as shown in FIG. 3, where a series of such bundles are placed in a subassembly; for example, numerals 20a, 20b, 20c, are bent, nested together to form a side-by-side relation. In similar manner, a second series of bundles 20f, 20g, and 20h, etc., are nested together and are then sealed together. In forming the bundles 20, the cladding may be sealed together by cement or fused by heat, or the like, into a rigid subassembly. This provides two groups of subassemblies 22a and 22b. Subassembly 22a is trimmed along the trim line 24a and the subassembly 22b is trimmed along trim line 24b to provide a flat surface so that the two units may be placed together and sealed into a single unit, shown in general by numeral 26, FIG. 4. The two joined subassemblies 22a and 22b may then be trimmed along an arcuate trim line 28, which is of the same curvature as the lens of the projector, and a straight planar trim line 30, which is straight and perpendicular to joint line 25 between the two subassemblies.

This specific two-group design has been assumed for purposes of analysis, and the following description relates to the two-group design. The key parameters are indicated on FIG. 5. The starting assumption for fibers of the arc-to-line converter to approach a subtend arc at +20° and −20° with respect to the arc bisector. This gives the range of angles of ±20° in each group, compared to ±40° for the single group case of FIG. 7. Since the fibers all have a single bend, it is necessary for them to meet the output surface at some angle other than 90°. Further, by assuming a straight line output of a length of 4.72 inches, an angle of 11.53° from normal (intercept angle from 90°) matches the overall line length to arc length. Since the total subtend arc is 80°, and the output length of 4.72 inches has been assumed, by the equation (1) $K = 4.72$ inches/80° which = 0.059 in/degree. With no magnification or distortion, the arc radius will be $R = 0.059 (180)/(\pi) = 3.38$ inches. With the simplest fiber optic converter shown in FIG. 7, the maximum distance $X_{max} = 3.38 \sin 40° = 2.173$ inches; whereas the desired (shown in FIG. 5) is 4.72 inches × ½ = 2.36 inches.

Since the invention utilizes two subassemblies, the starting assumption for the fiber is to approach the arc at +20° and −20° with respect to each arc bisector of each group. FIG. 8 compares the position errors for this design of the two bundle arrangement with the single bundle arrangement, where the single bundle arrangement shows 180 mils position error at 40° compared to a 0 error for the 40° arc position for double bundle. The output position error in mils is determined by the formula $\Delta X = X$ (ideal) $- X$ (actual).

FIG. 9 compares the distortion relative to the distance from the center with the percent distortion determined by $\Delta X/X$ plotted against the angle. This shows that while the two bundle distortion starts out relatively high, it diminishes rapidly to 0 at 20° and reverses to a minus beyond 20° to 30° and then back to 0 at 40°. On the other hand, the single bundle while starting at 0 rapidly increases far beyond any distortion of the double by 40°.

FIG. 10 compares the local magnification of the single bundles design against the double bundle design. From a comparison of the graphs it will be seen that the two bundle design is quite superior to the single bundle design.

The effect of NA (numerical aperture) on input and output angles from normal can be examined assuming a 0.1 NA input cone. The worst cases are found at the center and ends of the arc where the central array of the input cone centers the fiber at 20° from the fiber axis. For core glass having a 1.81 index, this corresponds to an NA of 0.34. Thus the range of the fiber will be $NA = 0.34 + 0.10$ or 0.24 to 0.44. The 0.44 NA ray will ge the extreme case. The effect of the 11.53° output angle will be to increase this to NA 0.78, so that the ray can still exit to air. This is clearly superior to the 40° case of the single bundle where no part of the 0.1 NA input cone is within the acceptance cone of a 1.81 − 1.48 fiber.

In considering an assembly for using the converter of the invention, a converter, shown in general by numeral 26, is mounted in position to receive light rays 40 from projector lenses, shown in general by numeral 42, along a total subtended arc θ. A lamp 44 passes rays through a film 46. An image from the film passes through the lenses 42 as diverging rays to the total subtended angle. The diverged image impinges upon arcuate face 28 of the converter. The converter 26 transmits the image from the rays to a flat image plane along the plane 30, across which a sheet of photosensitive copy material 48 is placed. This material may be moved in the direction of the arrows for continuous reproduction from the film 46 which is, likewise, moved to the projector. Thus, an image on the film in the projector may be moved up or down in the projector and reproduced on the flat sheet 48 by conversion from an arcuate image plane at face 28 to the straight line image plane 30 at the emitting face from the converter.

What is claimed is:

1. An arc-to-line converter comprising
   a. An optical fiber array including at least mirror image subassemblies joined together along a plane;
   b. each said subassembly including a plurality of lengths of optical fibers bent at a predetermined angle and nested together;
   c. each said subassembly being secured to a mirror image subassembly with the legs of the angled fibers contacting along said plane;
   d. one edge of exposed optical fibers being formed into an arcuate plane generally transverse to the axes of said fibers; and
   e. the opposite edge of exposed optical fibers being formed into a straight plane generally transverse to the joining plane between said mirror image assemblies.

2. An arc-to-line converter according to claim 1 wherein said array includes two subassemblies joined along a plane therebetween.

3. An arc-to-line converter according to claim 1, wherein each said subassembly includes a plurality of vertically and horizontally stacked optical fibers.

4. An arc-to-line converter according to claim 1 wherein said fibers are stacked vertically of a height equal to the desired thickness of the converter.

5. An arc-to-line converter according to claim 1 wherein two subassemblies are joined along a straight plane centrally of said subassemblies.

6. An arc-to-line converter according to claim 1 wherein the width of said arcuate plane is sufficient to intercept the desired subtended arc of a projected beam at a predetermined distance from a projector lens.

7. An arc-to-line converter according to claim 1 wherein said predetermined angle of bend of said lengths of optical fibers provides a minimum angle of input to the numerical aperture of said fibers and a minimum angle from normal to said straight plane.

8. An arc-to-line converter according to claim 1 wherein said angle of bend of said lengths of optical fibers permits said converter to intercept a subtended angle of up to about 40° with minimum distortion and local magnification.

9. An arc-to-line converter according to claim 1 wherein said arcuate plane has substantially the same radius of curvature as the lens of a projector which projects a beam to be subtended.

10. An arc-to-line converter according to claim 1 wherein the leg of each fiber at the arcuate plane is bent about 20° from a plane normal to the apex of the angle and the other leg is bent at about 12°.

11. An arc-to-line converter according to claim 1 wherein said optical fibers are clad fibers.

* * * * *